(No Model.)
E. C. PHILLIPS.
BORING BIT.
No. 458,640. Patented Sept. 1, 1891.
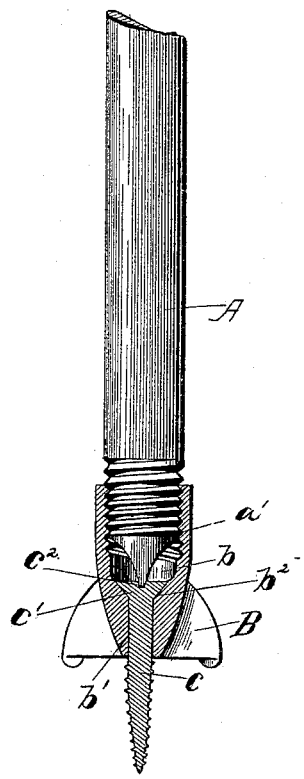
Witnesses:
Wm. M. Rheem
E. C. Wurdeman
Inventor:
Elwood C. Phillips

UNITED STATES PATENT OFFICE.

ELWOOD C. PHILLIPS, OF CHICAGO, ILLINOIS.

BORING-BIT.

SPECIFICATION forming part of Letters Patent No. 458,640, dated September 1, 1891.

Application filed March 6, 1891. Serial No. 384,039. (No model.)

*To all whom it may concern:*

Be it known that I, ELWOOD C. PHILLIPS, a citizen of the United States, residing at Chicago, in the county of Cook and State of Illinois, have invented certain new and useful Improvements in Boring-Bits; and I do hereby declare the following to be a full, clear, and exact description of the invention, such as will enable others skilled in the art to which it appertains to make and use the same.

This invention relates to improvements in boring-bits; and the objects of my improvements are, first, to provide a bit which can be cheaply constructed; second, to so construct this bit that its shank and cutter will be separable; third, to so construct the cutter that an ordinary wood-screw may be used as its screw-point.

In the accompanying drawings, Figure 1 represents a side elevation of the devices embodying my invention. Fig. 2 represents a longitudinal section through the same, the shank being broken off. Fig. 3 represents a perspective detail view of the shank; and Fig. 4 represents a longitudinal section through the cutter and screw-point, a modified shank being attached.

A designates the shank, which is squared at one end $a$ to fit the brace or handle which is to turn the bit. At $a'$, the other end, this shank is screw-threaded to engage the screw-threaded recess $b$ in cutter B. The cutter B externally is an ordinary auger-cutter, except that the screw-point is omitted. Down through the center of this cutter is bored a hole $b'$. From the top down to about the center this hole is enlarged to form a recess $b$. The interior of this recess is screw-threaded and is of such a diameter that the head of a common wood-screw $c$ can easily pass into it. Where this recess joins the hole $b'$ an oblique ledge $b^2$ is formed, upon which the head of the screw $c$ rests.

When the device is to be put together, an ordinary wood-screw $c$ is inserted in recess $b$ and pushed down until its head $c'$ comes in contact with ledge $b^2$. The end of said screw is then projecting through hole $b'$ to some distance below cutter B, and forms the screw-point of said cutter. The screw is held firmly by end $a'$ of shank A pressing against it, or, preferably, as shown in Fig. 2, the end $a'$ is provided with a projection $a^3$, similar to a screw-driver end. This projection, when shank A is screwed into cutter B, engages the cut $c^2$ in screw $c$ and forces said screw to turn with it. When the cutter is not in use, this shank can be used as a screw-driver. Of course any-sized cutter may be fitted to the shank. The screw $c$, which is continuously, by striking nails or otherwise, having its threads broken, can easily be replaced, or different-sized screws can be inserted for different character of work.

I am aware that screws extending the whole length of the shank are in use, (Patent No. 421,218, granted to M. Wood on combined boring-bit, dated February 11, 1890,) and I do not claim the same.

Having thus described my invention, what I claim as new, and desire to secure by Letters Patent, is—

1. In a boring-bit, the combination of a shank with a cutter detachable therefrom, said shank and cutter being constructed with engaging parts, and a screw which is separable from said shank and cutter, but held in place by the engagement of the latter with each other, substantially as set forth.

2. In a boring-bit, the combination of a solid screw-threaded shank with a screw-threaded cutter engaging the said shank and a screw, the three being separable and the screw being held in place by the engagement of said shank with said cutter, substantially as set forth.

3. In a boring-bit, the combination of a screw-threaded shank with a cutter having a screw-threaded recess and a hole extending longitudinally through its center and a screw-point, the three being separable and the latter held in place by the engagement of said shank and cutter, the screw-point passing through the said hole, substantially as set forth.

4. In a boring-bit, the combination of a screw-threaded shank having a screw-driver point with a cutter having a screw-threaded recess to engage said shank and a screw-point held in place in said recess by said screw-driver point, substantially as set forth.

into the soft layer and thereby readily penetrate to the rear of the second layer. Again, in the construction of burglar-proof safes formed of layers or plates the safe requires 5. In a boring-bit, the combination of a shank screw-threaded at one end and squared at the other with a cutter provided with a screw-threaded recess to engage said shank, a ledge in said recess, and a screw having its head held firmly in place between said ledge and said shank, substantially as set forth.

In testimony whereof I affix my signature in presence of two witnesses.

ELWOOD C. PHILLIPS.

Witnesses:
C. M. GREENE,
B. WILLIAMS.